United States Patent
Hartzler et al.

(10) Patent No.: US 11,382,181 B2
(45) Date of Patent: Jul. 5, 2022

(54) METHOD TO CREATE CARBON NANOTUBE HEATERS WITH VARYING RESISTANCE

(71) Applicant: Goodrich Corporation, Charlotte, NC (US)

(72) Inventors: Brad Hartzler, Doylestown, OH (US); Tommy M. Wilson, Jr., Cuyahoga Falls, OH (US); Galdemir Cezar Botura, Akron, OH (US); Wenping Zhao, Glastonbury, CT (US); Zaffir A. Chaudhry, S. Glastonbury, CT (US)

(73) Assignee: Goodrich Corporation, Charlotte, NC (US)

( * ) Notice: Subject to any disclaimer, the term of this patent is extended or adjusted under 35 U.S.C. 154(b) by 1149 days.

(21) Appl. No.: 15/368,271

(22) Filed: Dec. 2, 2016

(65) Prior Publication Data
US 2018/0160482 A1    Jun. 7, 2018

(51) Int. Cl.
| | |
|---|---|
| *H05B 3/10* | (2006.01) |
| *H05B 3/14* | (2006.01) |
| *H05B 3/34* | (2006.01) |
| *C01B 32/168* | (2017.01) |

(Continued)

(52) U.S. Cl.
CPC ............... *H05B 3/145* (2013.01); *B05D 1/02* (2013.01); *B05D 1/32* (2013.01); *B05D 1/38* (2013.01); *B05D 3/007* (2013.01); *B05D 7/02* (2013.01); *B05D 7/52* (2013.01); *B64D 15/12* (2013.01); *C01B 32/168* (2017.08); *H05B 3/16* (2013.01); *H05B 3/18* (2013.01); *H05B 3/34* (2013.01); *B82Y 30/00* (2013.01); *B82Y 40/00* (2013.01); *C01B 2202/22* (2013.01); *C01B 2202/24* (2013.01); *H05B 2203/013* (2013.01);

(Continued)

(58) Field of Classification Search
CPC . H05B 3/145; H05B 3/34; H05B 3/16; H05B 3/18; B05D 1/02; B05D 1/32; B05D 1/38; B05D 3/007; B05D 7/02; B05D 7/52; B64D 15/12; C01B 32/168
See application file for complete search history.

(56) References Cited

U.S. PATENT DOCUMENTS

| | | |
|---|---|---|
| 8,197,621 B2 | 6/2012 | Jung |
| 8,581,158 B2 | 11/2013 | Heintz et al. |

(Continued)

FOREIGN PATENT DOCUMENTS

| | | |
|---|---|---|
| DE | 102009034306 A1 | 3/2011 |
| EP | 3182794 A1 | 6/2017 |
| WO | WO2016144683 A1 | 9/2016 |

OTHER PUBLICATIONS

Extended European Search Report for EP Serial No. 17204771.4, dated May 3, 2018, 8 Pages.

(Continued)

*Primary Examiner* — Sang Y Paik
(74) *Attorney, Agent, or Firm* — Kinney & Lange, P.A.

(57) ABSTRACT

A method for creating a carbon nanotube heater assembly includes creating a carbon nanotube heater with varying resistances and attaching the carbon nanotube heater to both carrier and encapsulating materials. Creating the carbon nanotube heater with varying resistances is accomplished by applying a carbon nanotube mixture to a substrate, adjusting the thickness or width of the carbon nanotube mixture, and drying the nanotube mixture.

4 Claims, 3 Drawing Sheets

(51) Int. Cl.
  *B05D 1/02*   (2006.01)
  *B05D 1/32*   (2006.01)
  *B05D 1/38*   (2006.01)
  *B05D 3/00*   (2006.01)
  *B05D 7/02*   (2006.01)
  *B05D 7/00*   (2006.01)
  *B64D 15/12*  (2006.01)
  *H05B 3/16*   (2006.01)
  *H05B 3/18*   (2006.01)
  *B82Y 30/00*  (2011.01)
  *B82Y 40/00*  (2011.01)

(52) U.S. Cl.
  CPC ...... *H05B 2214/02* (2013.01); *H05B 2214/04* (2013.01); *Y10S 977/742* (2013.01); *Y10S 977/842* (2013.01); *Y10S 977/932* (2013.01)

(56) References Cited

U.S. PATENT DOCUMENTS

| | | | |
|---|---|---|---|
| 8,664,573 | B2 | 3/2014 | Shah et al. |
| 8,752,279 | B2 | 6/2014 | Brittingham et al. |
| 9,091,657 | B2 | 7/2015 | Kessler et al. |
| 9,237,606 | B2 | 1/2016 | Vue et al. |
| 2008/0179448 | A1* | 7/2008 | Layland .............. B64D 15/12 244/1 N |
| 2009/0314765 | A1* | 12/2009 | Feng .................. H05B 3/145 219/520 |
| 2010/0096507 | A1 | 4/2010 | Villinger |
| 2014/0034633 | A1 | 2/2014 | Heintz et al. |
| 2014/0070054 | A1 | 3/2014 | Burton et al. |
| 2014/0071216 | A1 | 3/2014 | Hu et al. |
| 2016/0007474 | A1 | 1/2016 | Dardona et al. |
| 2016/0221680 | A1 | 8/2016 | Burton et al. |

OTHER PUBLICATIONS

Communication Pursuant to Article 94(3) EPC for EP Application No. 17204771.4, dated May 7, 2020, pp. 6.

Second Communication Pursuant to Article 94(3) EPC for EP Application No. 17204771.4, dated Dec. 6, 2021, pp. 7.

First Brazilian Office Action for BR Application No. BR102017025497, dated Apr. 13, 2021, pp. 6.

* cited by examiner

METHOD TO CREATE CARBON NANOTUBE HEATERS WITH VARYING RESISTANCE

BACKGROUND

Carbon nanotubes (CNTs) are allotropes of carbon having a generally cylindrical nanostructure, and have a variety of uses in nanotechnology, electronics, optics and other materials sciences. CNTs are both thermally and electrically conductive. Due to these properties, CNTs can be used as heaters to prevent icing on aircraft parts, engines, or on other vehicles.

CNTs are available in various concentrations for creating CNT heaters. The range of available concentrations is limited, and results in a limited range of resistivity for ice protection systems using CNT heaters. This limited range of resistances directly impacts the performance of CNT heaters in ice protection operations; such limited resistivity does not allow ideal heat output of CNT heaters. An ideal output of heat is critical to keep aircraft surfaces from icing over and/or de-icing them.

SUMMARY

A method for creating a carbon nanotube heater assembly includes creating a carbon nanotube heater, wherein the carbon nanotube heater has more than one resistance, attaching the carbon nanotube heater to a carrier material, and covering the carbon nanotube heater with an encapsulating material. Creating the carbon nanotube heater includes applying a carbon nanotube mixture to a substrate, adjusting at least one of thickness or width of the carbon nanotube mixture, and drying the carbon nanotube mixture on the substrate.

A carbon nanotube heater assembly includes a carrier material, a carbon nanotube heater attached to the carrier material, wherein the carbon nanotube heater contains varying resistances, and an encapsulating material attached to the carbon nanotube heater opposite the carrier material.

DETAILED DESCRIPTION

A method of making CNT heaters for ice protection is proposed which utilizes various techniques to create CNT heater sheets of varying thickness and widths from a CNT mixture. Through the use of 2-D printing, 3-D printing, spraying or doctor blade (or equivalent tool) editing, CNT heater sheets' thicknesses, widths and resistances can be modified to create ideal heat output for ice protection.

Figure 1:
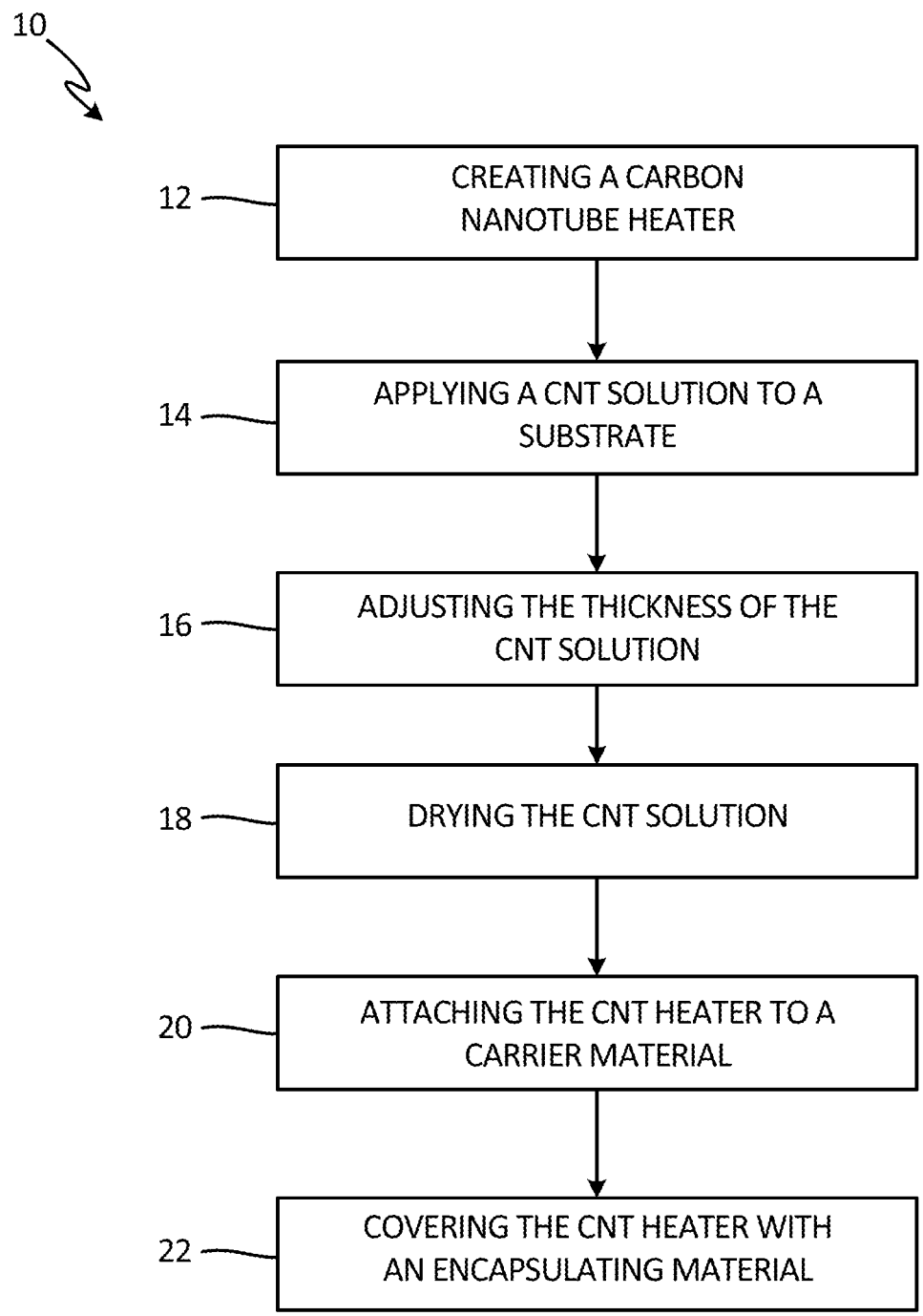
FIG. 1 is a flow chart depicting a method of making a CNT heater assembly with varying resistances.

FIG. 1 is a flow chart depicting method 10 of making a CNT heater assembly with varying resistances. Method 10 begins with step 12, creating a carbon nanotube heater. Step 12 includes steps 14-18.

Creating a CNT heater (step 12) begins with step 14, applying a CNT mixture to a substrate (a CNT solution, slurry, suspension or other appropriate mixture may be used). The CNT mixture can be carbon nanotubes suspended in a solvent or water, and can be a commercially available carbon nanotube mixture of an appropriate concentration of carbon nanotubes for the desired resistivity of the carbon nanotube heater. The substrate can be a composite material, a glass fiber pre-impregnated ("pre-preg") fabric, or other suitable substrate material.

Once the carbon nanotube mixture is applied to the substrate, the thickness or width of the CNT mixture is adjusted (step 16). When the CNT heater assembly is completed and applied to an aircraft part for ice protection, the aircraft part may require differing amount of heat in different areas. Thus, the completed CNT heater assembly should be able to heat the part at the desired rate without creating "hot" or "cold" spots on the aircraft part. For this reason, the resistance of the CNT heater assembly should be adjusted to match the shape and heating requirements of the aircraft part. The thickness or width of a CNT layer affects the layer's electrical resistivity. Thus, the thickness and width of the CNT mixture on the substrate is adjusted to create different resistances and contours in the CNT heater shape.

Adjusting the thickness and width of the CNT mixture can be accomplished through many methods, including, but not limited to, use of a doctor blade (or equivalent tool) to shape the CNT mixture, spraying the CNT mixture onto the substrate at varying rates and concentrations to create multiple thicknesses and widths (and thus differing resistances), or printing (either 2-D or 3-D printing, depending on the requirements of the aircraft part to be heated). The CNT mixture (or suspension or slurry) is typically viscous enough to allow adjustment of the mixture's thickness, width and shape on the substrate. Once the CNT mixture's shape, width and thickness have been adjusted, the CNT mixture can be dried in step 18.

To complete the CNT heater assembly, two other layers of materials are attached to the CNT heater in steps 20 and 22: a carrier material and an encapsulating material. The carrier material faces the breeze side of a finished assembly, and can be a film adhesive, a pre-impregnated fabric, a polyimide, or a neoprene, depending on the requirements of the system. The carrier material is chosen based on the external surface of the assembly, and to protect the CNT heater from external damage. The encapsulating material is attached to the CNT heater opposite the carrier material, on the bond side of the assembly. The encapsulating material can also be a film adhesive, a pre-impregnated fabric, a polyimide, or a neoprene, or other suitable insulating material, depending on the needs of the system. The encapsulating material is chosen based on the needs of the bond properties between the CNT heater and the aircraft part on which it will be attached.

The use of a CNT mixture that can be printed, sprayed, or adjusted with a doctor blade (or equivalent tool) to create variable resistances along the area of the CNT heater allows for the CNT heaters to have resistances that are tapered or the length or width of the area to be heated. This allows for CNT heaters to be designed with the specific aircraft part, and ice protection needs or requirements in mind, and for more efficient use of power when the CNT heater is energized. Furthermore, this allows for the creation of complex shapes and curvatures which can be applied to varying aircraft parts, such as an airfoil, nacelle, nosecone, engine cowl, or other aircraft engine parts.

Figure 2A:
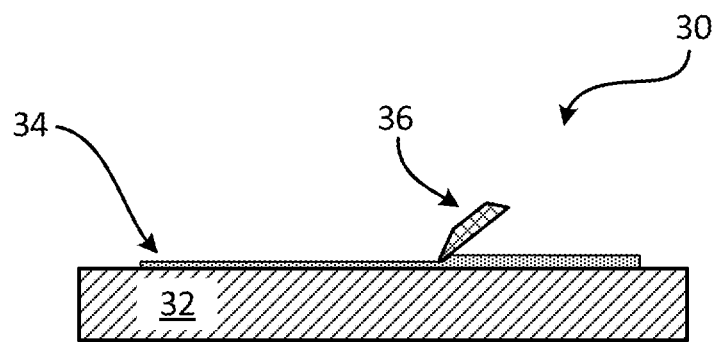
FIGS. 2A-2C are schematic diagrams of a method of making a CNT heater assembly with varying resistances using a doctor blade.
Figure 2B:
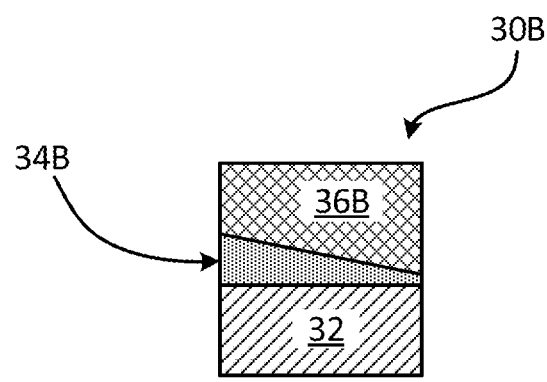
Figure 2C:
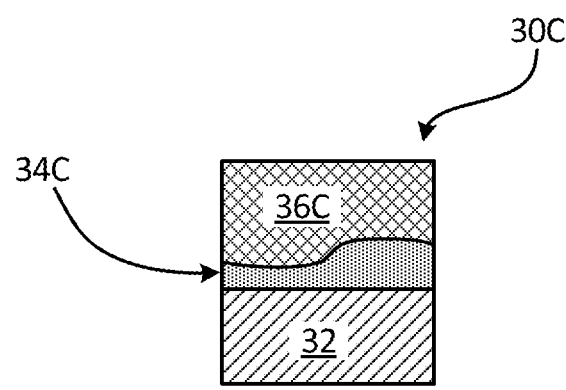

FIGS. 2A-2C are schematic diagrams of a method of making CNT heater assembly 30 with varying resistances using a doctor blade (or equivalent tool). A doctor blade is a tool designed to remove excess mixture or material in printing and coating processes. FIGS. 2A-2C will be discussed together and contain many of the same components, except where otherwise noted. In FIG. 2A, substrate 32 acts as a base for CNT mixture coating 34. Doctor blade 36 shapes CNT coating 34 to the desired shape, width, and thickness (and thus the desired resistance). By controlling the gap between doctor blade 36 and substrate 32, CNT coating 34 thickness and width can be controlled, and therefore, the resistance of CNT coating 34 can be varied along the path of doctor blade 36.

FIGS. 2B and 2C depict two different resulting CNT heater assemblies, 30B and 30C. In FIG. 2B, controlling the gap between doctor blade 36B and substrate 32 allows for the thickness and width of CNT coating 34B to be controlled, and the resistance of CNT coating 34B is varied at a constantly increasing rate along the straight path of doctor blade 36B. In contrast, doctor blade 36C in FIG. 2C has a blade tip which is curved, which can both create varying thicknesses and widths in CNT coating 34C, and create contours in CNT coating 34C to conform the shape of CNT coating 34C to the shape of an aircraft part to which it will be applied, such that the correct resistances are applied to the correct parts of the aircraft. Alternatively, CNT coating 34C may not conform to the shape of the part, but can be thicker or thinner in areas that require more or less ice protection, such as a blade tip. Thus, this method also allows for conformability of shape of CNT coatings to aircraft parts in need of ice protection, not only varying resistances.

Alternatively, a spray nozzle assembly can be used to make a CNT heater assembly with varying resistances using spraying techniques. In this technique, a spray nozzle assembly includes a nozzle, a canister, and an arm. The arm is attached to external machinery and electronics, which can include a user interface or controls to program or directly control the movement of the arm and the nozzle. The canister is secured to the arm and attached to the nozzle. The canister feeds a CNT mixture to the nozzle. The nozzle, as directed by controls or programming, sprays CNT mixture onto a substrate. The spray nozzle assembly can be programmed to apply CNT mixture to a substrate in a particular pattern, in varying thicknesses, widths, and densities, or for longer exposure times, to create a CNT heater with varying resistances for use in ice protection.

Alternatively, a printing technique could be used to adjust the thickness and widths of the CNT mixture. Similar to methods described using a doctor blade or spray nozzle, 2-D or 3-D printing can be used to create a carbon nanotube heater assembly with varying resistances, as described in relation to FIG. 1. With 2-D and 3-D printing techniques, the printers can be programmed to apply a carbon nanotube mixture to a substrate with varying shapes, contours, widths or thicknesses, that results both in conformable carbon nanotube heaters and carbon nanotube heaters with resistances tailored to match an aircraft part to which they will be applied.

The proposed methods can also be used to adjust the width of a carbon nanotube mixture applied to a substrate. For example, printing or spraying carbon nanotube mixture can be applied to a pattern on the substrate surface. Alternatively, masking can be used to protect certain portions of a substrate from carbon nanotube mixture. Adjusting the width of the CNT mixture can allow for differences of gaps, spacing, and density of the mixture, depending on the needs of the system.

Figure 3A:
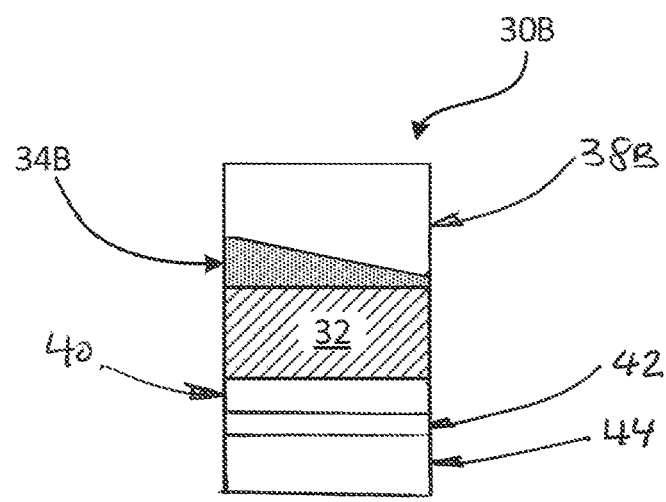
FIGS. 3A-3B are schematic diagrams of two embodiments of CNT heater assemblies.
Figure 3B:
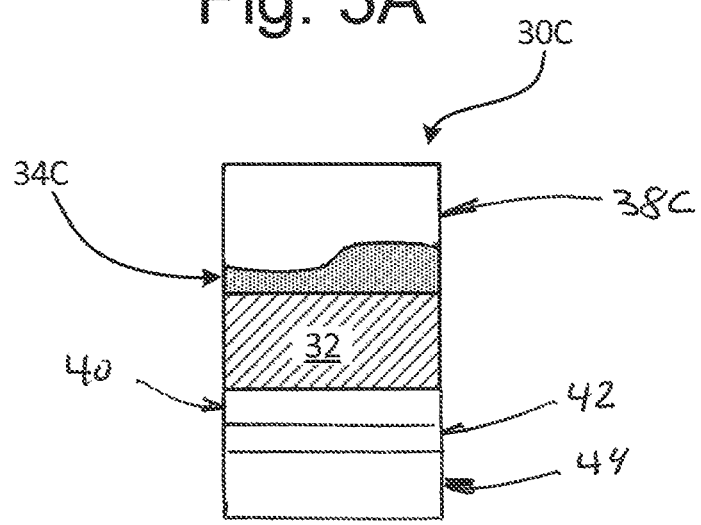

The proposed method produces CNT heaters with specific, varying resistances in a single heater. This allows CNT heaters to be specifically tailored to aircraft parts requiring ice protection. The varying thickness, width and shape of CNT heaters correlates to the resistances of the CNT heaters, and how much current is required for effective ice protection. The resulting CNT heaters have resistances that are lower than those obtained in current manufacturing processes. This results in more efficient heating and ice protection by the CNT heaters by reducing the amount of power required to keep an aircraft part surface free from ice. FIGS. 3A and 3B show two embodiments of such CNT heater assemblies with the embodiment of FIG. 3A corresponding to the embodiment shown in FIG. 2B and the embodiment of FIG. 3B corresponding to the embodiment shown in FIG. 2C. Other embodiments are also within the scope of the disclosure. As shown in FIG. 3A, carbon nanotube heater 30B includes carbon nanotube coating 34B applied to substrate 32. Carrier material 38B is attached to the carbon nanotube heater 30B adjacent the carbon nanotube coating 34B. Encapsulating material 40 is attached to the carbon nanotube heater 30B opposite the carrier material 38 and is bonded to aircraft part 44 with adhesive layer 42. As shown in FIG. 3B, carbon nanotube heater 30C includes carbon nanotube coating 34C applied to substrate 32. Carrier material 38C is attached to the carbon nanotube heater 30C adjacent the carbon nanotube coating 34C. Encapsulating material 40 is attached to the carbon nanotube heater 30B opposite the carrier material 38 and is bonded to aircraft part 44 with adhesive layer 42.

Additionally, the CNT heaters are lightweight, conformable and cost-effective. CNTs are a very light weight material compared to metallic or other alternative heaters used in ice protection. The CNT material, when shaped through the use of a doctor blade, spraying, or printing, can be contoured to the desired size and shape of an aircraft part to which it will be applied. Finally, CNT materials designed this way are durable and energy efficient. The resulting CNT heaters will only produce as much heat as is needed for the specific ice protection, and avoid hot or cold spots during the ice protection process.

Discussion of Possible Embodiments

The following are non-exclusive descriptions of possible embodiments of the present invention.

A method for creating a carbon nanotube heater assembly includes creating a carbon nanotube heater, wherein the carbon nanotube heater has more than one resistance, attaching the carbon nanotube heater to a carrier material, and covering the carbon nanotube heater with an encapsulating material. Creating the carbon nanotube heater includes applying a carbon nanotube mixture to a substrate, adjusting at least one of thickness or width of the carbon nanotube mixture, and drying the carbon nanotube mixture on the substrate.

The method of the preceding paragraph can optionally include, additionally and/or alternatively, any one or more of the following features, configurations and/or additional components:

Adjusting the at least one of the thickness and the width of the carbon nanotube mixture is done with a doctor blade.

The method includes controlling a gap between the doctor blade and the substrate, such that the at least one of the thickness and the width of the carbon nanotube mixture is controlled.

Adjusting the at least one of the thickness and the width of the carbon nanotube mixture further comprises creating at least two different thicknesses.

The doctor blade has a curvature such that the carbon nanotube mixture can be contoured.

The method includes bonding the encapsulating material to an aircraft part for ice protection.

Adjusting the at least one of the thickness and the width of the carbon nanotube mixture is accomplished by spraying the carbon nanotube mixture onto the substrate with a nozzle.

The nozzle can be adjusted to allow varying the at least one of the thickness and the width of the carbon nanotube mixture.

The nozzle can be programmed to apply the carbon nanotube mixture to an aircraft part according to a curvature of the aircraft part.

Adjusting the at least one of the thickness and the width of the carbon nanotube mixture is accomplished by printing. The width of the carbon nanotube mixture is adjusted by masking one or more parts of the substrate and applying the carbon nanotube mixture to parts that are not masked.

The width of the carbon nanotube mixture is adjusted by applying a pattern to the substrate, the pattern determining density of the carbon nanotube mixture on the substrate.

The printing allows varying the at least one of the thickness and the width of the carbon nanotube mixture.

The printing allows varying contours of the carbon nanotube mixture according to a curvature of an aircraft part.

A carbon nanotube heater assembly includes a carrier material, a carbon nanotube heater attached to the carrier material, wherein the carbon nanotube heater contains varying resistances, and an encapsulating material attached to the carbon nanotube heater opposite the carrier material.

The assembly of the preceding paragraph can optionally include, additionally and/or alternatively, any one or more of the following features, configurations and/or additional components:

The carbon nanotube heater is contoured to curves of an aircraft part.

The carbon nanotube heater has varying at least one of a thickness and a width.

The carrier material is selected from the group consisting of a film adhesive, a pre-impregnated fabric, a polyimide, or a neoprene.

The encapsulating material is selected from the group consisting of a film adhesive, a pre-impregnated fabric, a polyimide, or a neoprene.

The assembly includes an adhesive bonding the encapsulating material to an aircraft part.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A carbon nanotube heater assembly comprising:
a carbon nanotube heater comprising a carbon nanotube coating applied to a substrate such that the thickness and width of the carbon nanotube coating vary along the substrate to vary the resistance of the carbon nanotube coating along the substrate;
a carrier material attached to the carbon nanotube heater;
an encapsulating material attached to the carbon nanotube heater opposite the carrier material; and
an adhesive layer bonding the encapsulating material to an aircraft part.

2. The assembly of claim 1, wherein the carbon nanotube heater is contoured to curves of an aircraft part.

3. The assembly of claim 1, wherein the carrier material is selected from the group consisting of a film adhesive, a pre-impregnated fabric, a polyimide, and a neoprene.

4. The assembly of claim 1, wherein the encapsulating material is selected from the group consisting of a film adhesive, a pre-impregnated fabric, a polyimide, and a neoprene.

* * * * *